(12) United States Patent
Hansen et al.

(10) Patent No.: US 7,865,142 B2
(45) Date of Patent: *Jan. 4, 2011

(54) METHOD AND SYSTEM FOR MULTISESSION BLUETOOTH COMMUNICATION USING MULTIPLE PHYSICAL (PHY) LAYERS

(75) Inventors: Christopher Hansen, Sunnyvale, CA (US); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 579 days.

This patent is subject to a terminal disclaimer.

(21) Appl. No.: 11/849,832

(22) Filed: Sep. 4, 2007

(65) Prior Publication Data

US 2008/0310394 A1 Dec. 18, 2008

Related U.S. Application Data

(60) Provisional application No. 60/943,990, filed on Jun. 14, 2007.

(51) Int. Cl.
*H04B 7/00* (2006.01)

(52) U.S. Cl. .................................. 455/41.2; 455/41.3

(58) Field of Classification Search ................ 455/41.2, 455/41.3, 500, 513, 456.1; 370/464, 469
See application file for complete search history.

(56) References Cited

U.S. PATENT DOCUMENTS 7,639,182 B2 * 12/2009 Schmidt et al. ............. 342/458

* cited by examiner

*Primary Examiner*—Eugene Yun
(74) *Attorney, Agent, or Firm*—McAndrews, Held & Malloy, Ltd.

(57) ABSTRACT

A wireless device may utilize a plurality of Bluetooth sessions to perform a plurality of applications simultaneously in said wireless device. A Bluetooth interface may be utilized to perform initial connectivity and/or control functionality associate with each of said plurality of Bluetooth sessions. The connectivity and/or control functionality may comprise discovery, pairing, and/or initial connection. Each of the plurality of Bluetooth sessions may comprise utilizing one or more of a plurality of high speed data standards to perform data transmission and/or reception. The plurality of high speed data standard may comprise WLAN, ultra-wideband (UWB), and/or 60 GHz PHY and/or PHY/MAC layers. Two or more of the plurality of Bluetooth sessions may contemporaneously utilize different PHY and/or PHY/MAC layers pertaining to the same high speed data standard. Performing each of the plurality of applications may comprise utilizing one or more of the plurality of Bluetooth sessions.

32 Claims, 4 Drawing Sheets

METHOD AND SYSTEM FOR MULTISESSION BLUETOOTH COMMUNICATION USING MULTIPLE PHYSICAL (PHY) LAYERS

CROSS-REFERENCE TO RELATED APPLICATIONS/INCORPORATION BY REFERENCE

This patent application makes reference to, claims priority to and claims benefit from: U.S. Provisional Application Ser. No. 60/943,990 filed on Jun. 14, 2007.

This application also makes reference to: U.S. patent application Ser. No. 11/584,213 filed on Oct. 20, 2006.

Each of the above stated applications is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable].

FIELD OF THE INVENTION

Certain embodiments of the invention relate to wireless communication. More specifically, certain embodiments of the invention relate to a method and system for multisession Bluetooth communication using multiple physical (PHY) layers.

BACKGROUND OF THE INVENTION

The field of wireless communication has seen dramatic growth the last few years. In today's world, most people use their wireless devices for various purposes, business and personal, on a constant and daily basis. Society is truly becoming a wireless one. Numerous wireless solutions have been introduced, and have made tremendous strides into everyday's life.

For example, the use of Wireless Personal Area Networks (WPAN) has been gaining popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits (typically, a 10-meter range). WPAN may be based on standardized technologies, for example Class 2 Bluetooth (BT) technology. While WPAN may be very beneficial for certain applications, other applications may require larger service areas and/or capabilities.

Many devices nowadays, including such devices as cellular phones, PDA's, and/or laptops, comprise wireless capabilities; including the Bluetooth protocol, which may be suitable for operations pertaining to interacting with other wireless devices that may be located within Bluetooth interface operational range. While wireless devices may have initially been intended solely for uses consistent with peer-to-peer communication, other applications and uses have appeared and/or gained popularity in recent years. These non-communicative operations may comprise audio/video applications such as still and moving picture recording application and voice recording applications. Though the Bluetooth interface may be suitable and/or optimal for communicative operations, its transmission data rates may prevent and/or limit the use of the Bluetooth interface for applications that may necessitate high transmission data rates, for example, video streaming.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for multisession Bluetooth communication using multiple physical (PHY) layers, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for multisession Bluetooth communication using multiple physical (PHY) layers. A wireless device may utilize a plurality of Bluetooth sessions to handle a plurality of applications simultaneously. The Bluetooth interface may be utilized to perform initial connectivity and/or control functionality associated with each of said plurality of Bluetooth sessions. This connectivity and/or control functionality may comprise discovery, pairing, and/or initial connection. Each of the plurality of Bluetooth sessions may comprise utilizing one or more of a plurality of high speed data standards to perform data transmission and/or reception. The plurality of high speed data standard may comprise WLAN, ultra-wideband (UWB), and/or 60 GHz PHY, and/or PHY/MAC layers. Two or more of the plurality of Bluetooth sessions may contemporaneously utilize different PHY and/or PHY/MAC layers pertaining to the same high speed data standard.

Figure 1:
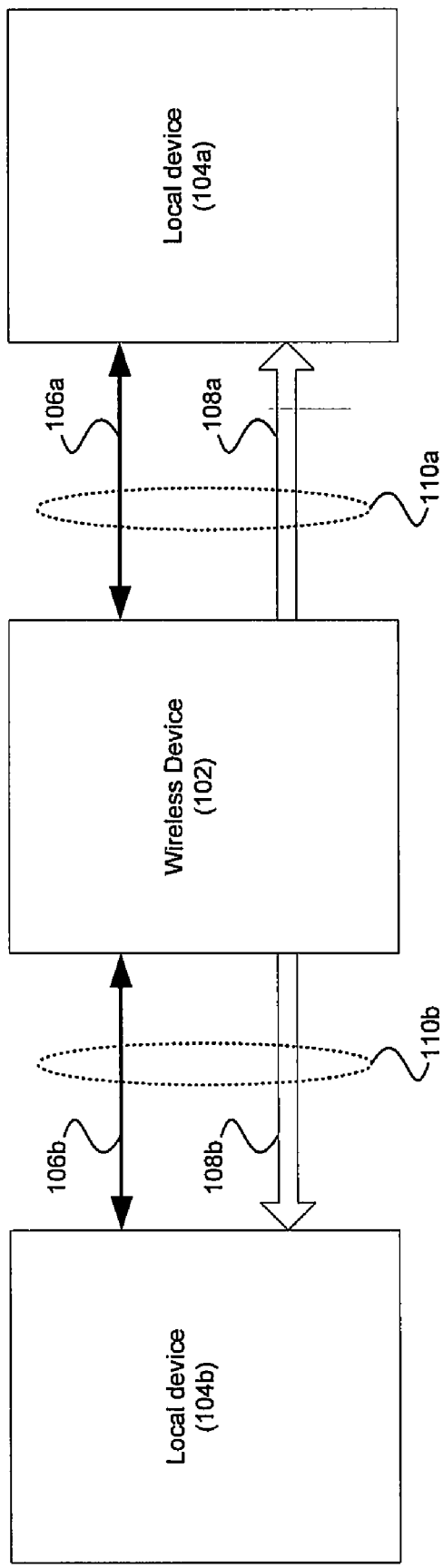
FIG. 1 is a block diagram illustrating an exemplary wireless device that utilizes multiple sessions for data communication, in accordance with an embodiment of the invention.

FIG. 1 is a block diagram illustrating an exemplary wireless device that utilizes multiples sessions for data transmissions, in accordance with an embodiment of the invention. Referring to FIG. 1, there is shown a wireless device 102, local devices 104a and 104b, Bluetooth connections 106a and 106b, high speed data connections 108a and 108b, and data communication sessions 110a and 110b.

The wireless device 102 may comprise suitable logic, circuitry and/or code that may enable performing wireless mobile communication utilizing Bluetooth protocol (IEEE 802.15) and other wireless protocols. For example, the wireless device 102 may enable data communication via WLAN (IEEE 802.11), Ultra-wideband (UWB), and/or 60 GHz interface. The wireless device 102 may also comprise suitable logic, circuitry and/or code that may enable performing additional functionality that may necessitate generation and/or transmission of large data files. For example, the wireless device 102 may enable generation and/or transmission of multimedia data, such as audio clips, video clips, still pictures, and/or other types of multimedia data that may be generated while performing jobs on the wireless device 102.

The local devices 104a and 104b may comprise suitable logic, circuitry and/or code that may enable high speed data communications with the wireless device 102 via one or more wireless interfaces. The wireless device 102 may communicate with and/or transmit large data files the local devices 104a and/or 104b. The invention may not be limited to a specific type of local devices, but may comprise for example, a general purpose processing device, a specialized processing device, and/or a specialized peripheral device which may be enabled to perform various jobs and/or tasks that may be requested by the wireless device 102. For example, local devices 104a and/or 104b may comprise a personal computer (PC), a high-definition television (HDTV) set, a printer/scanner/fax device, a dedicate memory storage device, and/or a digital video recorder device. Transmitting such large data files may enable utilization of improved capabilities local devices 104a and/or 104b, and/or preserve resources within the wireless device 102 by delegating some of the tasks that may be requested in the wireless device 102. For example, a home PC that may be more capable or suitable of performing processing and/or storage operations of large data files than the wireless device 102 due to more powerful processing subsystems and/or increased memory space compared to the wireless device 102. Such home PC may be better suited to perform processing and/or storage intensive tasks that otherwise would have to be performed in the wireless device 102. Similarly, a networked HDTV monitor may be more suitable for display high definition multimedia content rather than the wireless device 102.

The data communication sessions 110a comprises the Bluetooth connection 106a and the high speed data connection 108a. Similarly, the data communication sessions 110b comprises the Bluetooth connection 106b and the high speed data connection 108b.

In operation, the wireless device 102 may need to perform high speed data transmission, for example, where large data files may have to be transmitted from the wireless device 102. The wireless device 102 may utilize plurality of data transmission session to contemporaneously transmit data. For example, the wireless device 102 may utilize the data communication sessions 110a and 110b to transmit data contemporaneously to the local devices 104a and 104b.

The wireless device 102 and local devices 104a and/or 104b may be enabled to utilize Bluetooth protocol (IEEE 802.15). The Bluetooth protocol may enable efficient discovery, pairing, and initial setup functionality. The wireless device 102 may utilize discovery functionality of the Bluetooth protocol to discover local devices that may comprise the Bluetooth interface. Once the wireless device 102 is enabled to discover the local devices 104a and/or 104b, the wireless device 102 and local devices 104a and/or 104b may utilize the Bluetooth protocol pairing functionality to establish the Bluetooth connections 106a and/or 106b, respectively. The Bluetooth protocol, while it may be optimal for local discovery and/or pairing operations, is not efficient and/or convenient for transfer of large data files. The wireless device 102 may utilize the Bluetooth connections 106a and/or 106b to determine non-Bluetooth wireless interfaces that the local devices 104a and/or 104b may support. Consequently, the wireless device 102 may then establish high speed data connections 108a and/or 108b utilizing the available wireless interfaces, which may enable transmission of data from wireless device 102 to the local devices 104a and/or 104b at higher rates than available via the Bluetooth interface. For example, the wireless device 102 may determine that the local device 104a may support a 60 GHz interface. The 60 GHz interface/protocol may enable high speed data transmission that may range from 2 to 10 Gbps (Gigabit per second). The 60 GHz interface may then be utilized to establish the high speed data connection 108a. The Bluetooth connection 106a may be utilized during data transmission over the high speed transmission connection 108a to continually monitor and/or manage the data transmission. Similarly, the wireless device 102 may determine that the local device 104b may support WLAN interface. The WLAN interface may then be utilized to establish the high speed data connection 108b. The Bluetooth connection 106b may be utilized during data transmission over the high speed transmission connection 108b to continually monitor and/or manage the data transmission.

Figure 2:
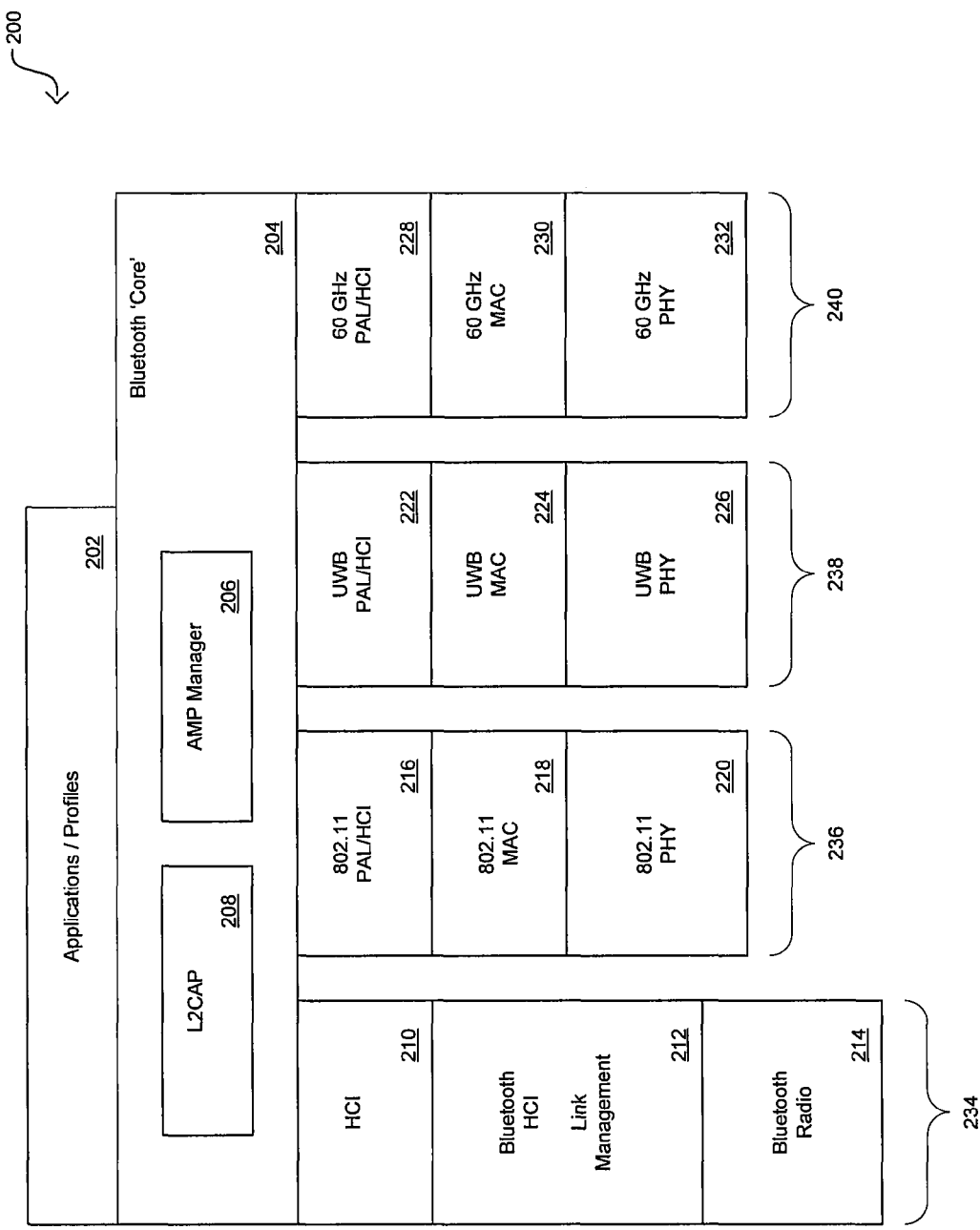
FIG. 2 is a block diagram illustrating an exemplary protocol stack diagram for Bluetooth that enables utilizing other physical layers for data transmissions, in accordance with an embodiment of the invention.

FIG. 2 is a block diagram illustrating an exemplary protocol stack diagram for Bluetooth that enables utilizing other physical layers for data transmissions, in accordance with an embodiment of the invention. Referring to FIG. 2, there is shown a Bluetooth stack 200 that may comprise applications/profiles layer 202, and a Bluetooth core 204. The Bluetooth core 204 may comprise a Logical Link Control and Adaptation Protocol (L2CAP) 206, and an alternate MAC/PHY Manager (AMP) 208. There is also shown a Bluetooth interface 234, an 802.11 interface 236, an ultra-wide band (UWB) interface 238, and a 60 GHz interface 240. The Bluetooth interface 234 may comprise a Bluetooth HCI interface 210, an HCI link management block 212, and a Bluetooth radio block 214. The 802.11 interface 236 may comprise an 802.11 PAL/HCI block 216, an 802.11 MAC 218, and an 802.11 PHY 220. The ultra-wide band (UWB) interface 238 may comprise an UWB PAL/HCI block 222, an UWB MAC 224, and an UWB PHY 226, The 60 GHz interface 240 may comprise a 60 GHz PAL/HCI block 228, a 60 GHz MAC 230, and a 60 GHz PHY 232. The 802.11 interface 234, the ultra-wide band (UWB) interface 238, and the 60 GHz interface 240 may be referred to as alternate interfaces.

The Bluetooth core 204 may be a link layer interface for Bluetooth communications. The Bluetooth core 204 may enable utilizing the Bluetooth interface 234 in instances where the Bluetooth radio 214 may be utilized to transmit and/or receive data. The AMP 208 may enable connecting alternative interfaces that may incorporate non-Bluetooth MAC/PHY below the Bluetooth core layer to operate the Bluetooth applications and profiles at the top. In instances where other MAC/PHY interfaces may be utilized, a protocol adaptation layer/host controller interface (PAL/HCI) layers for each of the MAC/PHY interfaces may be utilized to enable utilizing non-Bluetooth radio interfaces to communicate data corresponding to applications running within the applications/profiles layer 202.

In operation, the Bluetooth stack 200 may be enabled to setup data communication sessions that may utilize secondary physical layers for high speed data transmission. During a discovery process in Bluetooth, a Bluetooth-capable device that may be located in the neighborhood of another Bluetooth-capable device may be able to recognize each other. During a pairing process in Bluetooth, two Bluetooth-capable devices may decide that they want to communicate with each other and they may establish a secure key and start sharing information with each other. The pairing process may be performed over legacy Bluetooth radio. For example, the wireless devices 102 may utilize the Bluetooth core 204, the Bluetooth HCI 210, the Bluetooth HCI link management layer 212, and the Bluetooth radio 214 in performing discovery and/or pairing operations with the local devices 104a and/or 104b.

During data transmissions, the wireless device 102 may determine the type of connection, data rate and latency required for acceptable completion of data transmissions. Where Bluetooth interface may not sufficiently enable performing the required data transmissions, secondary physical layers that may be better suited for the data transmission may be utilized.

In accordance with an embodiment of the invention, multiple physical layers may be utilized to perform data transmissions contemporaneously during one or more data communication sessions. Applications running on top of the Bluetooth stack 200, within the applications/profiles layer 202 may send the transmitted data. Consequently, the Bluetooth core 204 may enable transmission of the data wherein use of secondary, non-Bluetooth, physical layers may be made transparent during each of the data communication sessions. For example, the AMP manager 206 may enable managing and/or controlling data transmission via the 802.11 interface, the UWB interface, and/or the 60 GHz interface.

Within the 802.11 PAL/HCI layer 216, the HCI functionality may be enabled to power the PAL functionality, and one or more control frames or packets that are output from the L2CAP layer 208 may be aggregated into large frames to fit into the 802.11 MAC layer 218. The transmission and/or reception of control frames may be performed via the 802.11 PHY layer (radio) 220. The 802.11 PAL/HCI layer 216 may be enabled to aggregate frames received from the L2CAP layer 208. The 802.11 PAL/HCI layer 216 may be enabled to present an assessment of the channel quality to the AMP manager 206. Within the UWB PAL/HCI layer 222, the HCI functionality may be enabled to power the PAL functionality, and one or more control frames or packets that are output from the L2CAP layer 208 may be aggregated into large frames to fit into the UWB MAC layer 224. The transmission and/or reception of control frames may be performed via the UWB PHY layer (radio) 226. The UWB PAL/HCI layer 222 may be enabled to aggregate frames received from the L2CAP layer 208. The UWB PAL/HCI layer 222 may be enabled to present an assessment of the channel quality to the AMP manager 206.

Within the 60 GHz PAL/HCI layer 228, the HCI functionality may be enabled to power the PAL functionality, and one or more data frames or packets that are output from the L2CAP layer 208 may be aggregated into large frames to fit into the 60 GHz MAC layer. The 60 GHz PAL/HCI layer 228 may be enabled to aggregate frames received from the L2CAP layer 208. The 60 GHz PAL/HCI layer 228 may be enabled to present an assessment of the channel quality to the AMP manager 206.

In another embodiment of the invention, there may be simultaneous connections over one or more MAC/PHY layers with one application running over Bluetooth enabling simultaneous utilization of multiple secondary physical layers. Consequently, transmitted data may be multiplexed over multiple connections to increase the quality of service. For example, the Bluetooth stack 200 may enable simultaneous use of the WLAN (IEEE 802.11), UWB, and 60 GHz interfaces. The 60 GHz may be faster but it may be subject to dropouts or line of sight (LOS) interference problems. If there is a dropout on 60 GHz, the connection may not be used completely because lower rate frames may be sent over the WLAN or the UWB connections. During a pairing process in Bluetooth, there may be a mapping of slots between two Bluetooth devices. The Bluetooth device attempting to transmit data may setup a link with a first Bluetooth device via the 60 GHz interface 240 while communicating with another Bluetooth device at a lower rate via another alternate interface such as the 802.11 interface 236 and/or the UWB interface 238.

Where simultaneous connectivity over available secondary physical layers, the Bluetooth stack 200 may enable switching among available secondary physical layers during a data transmission session to ensure completion of the data transmission. For example, where issues may arise during data transmission over the 60 GHz interface, the Bluetooth stack 200 may enable switching to the WLAN (802.11) interface to ensure continuing the data transmission.

Figure 3:
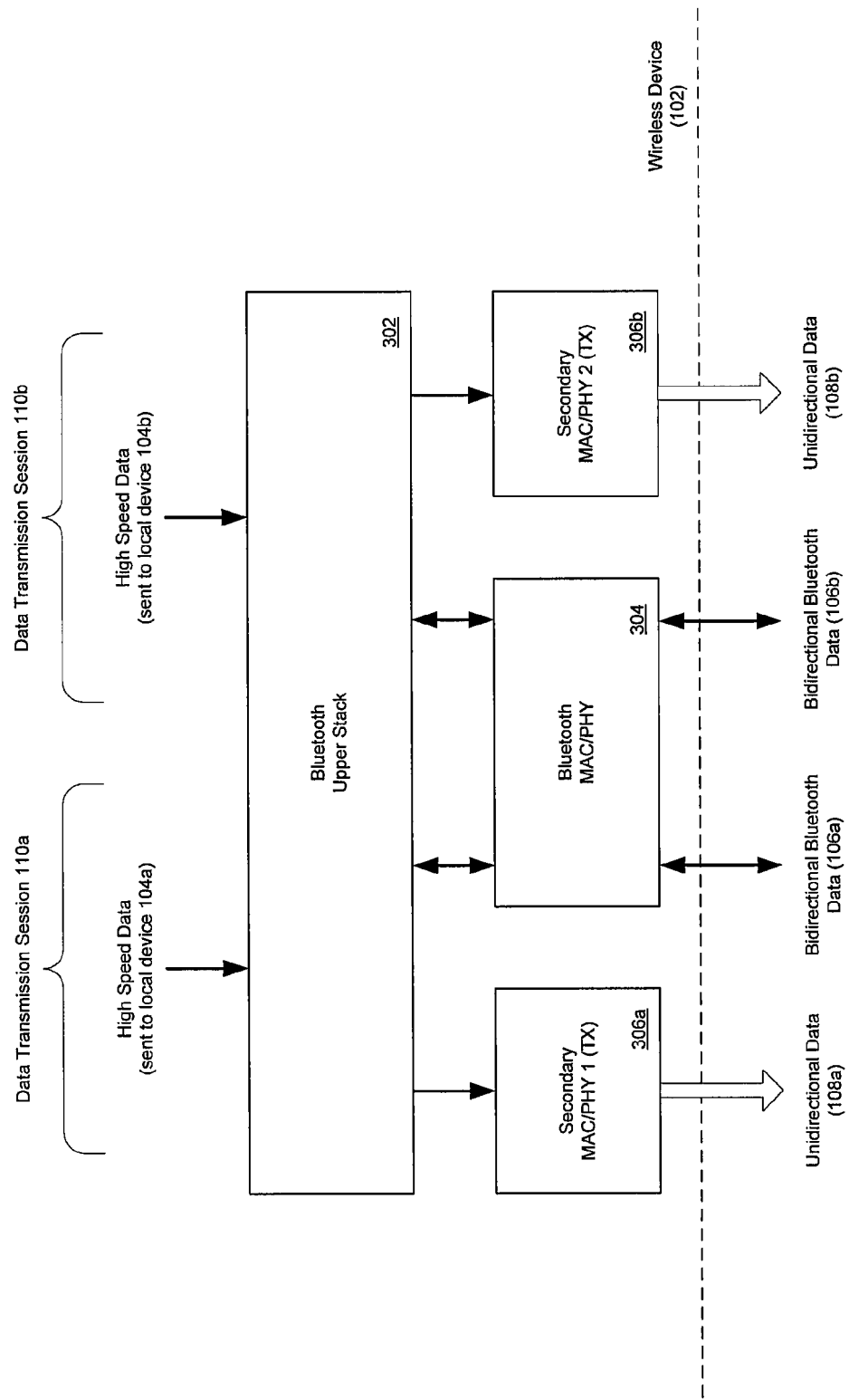
FIG. 3 is a block diagram illustrating two data communication sessions utilizing a single Bluetooth stack and multiple MAC/PHY layers to facilitate transmission of high speed data, in accordance with an embodiment of the invention.

FIG. 3 is a block diagram illustrating two data communication sessions utilizing a single Bluetooth stack and multiple MAC/PHY layers to facilitate transmission of high speed data, in accordance with an embodiment of the invention. Referring to FIG. 3, there is shown the wireless device 102 communicating data via the data communication sessions 110a and 110b, a Bluetooth upper stack 302, a Bluetooth MAC/PHY 304, and secondary MAC/PHY layers 306a and 306b.

The wireless device 102 may be comprises substantially as described in FIG. 1. The data communication sessions 110a and 110b may be comprised substantially as described in FIG. 1. The wireless device 102 may utilize a single Bluetooth protocol stack and multiple MAC/PHY layers to facilitate transmission of high speed data, wherein data transmitted via the data communication sessions 110a and 110b may be routed to appropriate MAC/PHY layers. The wireless device 102 may utilize the data communication sessions 110a and 110b to transmit high speed data to the local devices 104a and 104b.

The Bluetooth upper stack 302 may comprise functionality and/or layers within the Bluetooth protocol that may enable one or more applications running on top of Bluetooth stack to utilize MAC/PHY layers that may be utilized and/or controlled via the Bluetooth stack. For example, the Bluetooth upper stack 302 may comprise the Bluetooth core 204, substantially as described in FIG. 2. The Bluetooth upper stack 302 may be enabled to interact and/or control plurality of MAC/PHY layers, including non-Bluetooth MAC/PHY layers, utilizing appropriate interfaces and/or layers. For example, the Bluetooth upper stack 302 may comprise the AMP manager layer 206, the 802.11 PAL/HCI layer 216, the UWB PAL/HCI layer 222, and/or the 60 GHz PAL/HCI layer 228. The data transmission session 110a may utilize via a single link control, the L2CAP layer 206 for example, two MAC/PHY layers: the Bluetooth PHY layer 304 and the secondary MAC/PHY layer 306a. Similarly, the data transmission session 110a may utilize two MAC/PHY layers: the Bluetooth PHY layer 304 and the secondary MAC/PHY layer 306b.

The Bluetooth MAC/PHY layer 304 may comprise the Bluetooth PHY layer 214 as described in FIG. 2, and may also comprise other and/or additional functionality within the Bluetooth protocol to may enable medium access control (MAC) in the wireless device 102 that may be necessary for enabling utilization of the Bluetooth PHY 304. The Bluetooth MAC/PHY layer 304 may enable data transmission based on Bluetooth protocol. Additionally, the Bluetooth upper stack 302 and/or the Bluetooth MAC/PHY layer 304 may enable performing Bluetooth-based initial discovery, pairing, and/or initial setup operations with the local devices 104a and/or 104b.

The secondary MAC/PHY 306a may substantially comprise the 802.11 MAC/PHY layers 218 and 220, the UWB MAC/PHY layers 224 and 226, and/or the 60 GHz MAC/PHY layers 230 and 232, as described in FIG. 2, and may enable high speed data transmission. The MAC layers of the different PHY types may be incorporated into a single device. For example, when utilizing 802.11, UWB, and/or 60 GHz PHY layers, the MAC/PHY layer 302a may comprise 802.11 MAC layer 218, UWB MAC layer 224, and/or 60 GHz MAC layer 230, respectively. Similarly, the secondary MAC/PHY 306b may substantially comprise the 802.11 MAC/PHY layers 218 and 220, the UWB MAC/PHY layers 224 and 226, and/or the 60 GHz MAC/PHY layers 230 and 232, as described in FIG. 2, and may enable high speed data transmission.

The secondary MAC/PHY layers 306a and 306b may be configured for transmission in only one direction as a means for providing uninterrupted unidirectional data transmission from one device to the other. However, the Bluetooth MAC/PHY layer 304 may be used for providing one or more bidirectional control signals between the two devices. The bidirectional control signals may carry device management data such as configuration, timing, and/or control data. The one or more control signals may facilitate authentication and association of devices, assignment of a communication channel for transmitting high speed data between the two devices, and may also facilitate antenna training and setup for the two devices. The communication channel is implemented using the second MAC/PHY layers 306a and 306b provided in the two devices. The communication channel may be used to carry the high speed data that is transmitted unidirectionally from the first device to the second device. The second physical layer 232 may transmit the high speed data using a frequency division multiple access (FDMA) or a time division multiple access (TDMA) protocol. In a representative embodiment, the high speed data may be transmitted at rates of up to approximately 10 Gbps when utilizing the 60 GHz PHY layer 232.

In operation, the wireless device 102 may be required to transmit data at high rates. The wireless device 102 may utilize the Bluetooth upper stack 302 and one or more secondary MAC/PHY layers to facilitate transmission of high speed data, wherein the data transmitted via different data communication sessions may be routed to the appropriate MAC/PHY layer for communication. The wireless device 102 may utilize Bluetooth protocol, via the Bluetooth upper stack 302 and the Bluetooth MAC/PHY 304 to perform Bluetooth discovery operations. In this regard, the wireless device 102 may discover the local device 104a and may determine it to be a suitable target of the requested data transmission during the data transmission session 110a. The wireless device 102 may also utilize the Bluetooth upper stack 302 and the Bluetooth MAC/PHY 304 to establish the Bluetooth connection 106a with the local device 104a, which may enable performing connection setup operations that may comprise pairing and/or security key initialization. The wireless device 102 may utilize the Bluetooth upper stack 302 and the secondary MAC/PHY layer 306a to establish the high speed data connection 108a to the local device 104a. Once the high speed data connection 108a is established, the wireless device 102 may transmit high speed data to the local device 104a over the high speed data connection 108a. Similarly, wireless device 102 may utilize Bluetooth protocol, via the Bluetooth upper stack 302 and the Bluetooth MAC/PHY 304 to perform Bluetooth discovery operations. In this regard, the wireless device 102 may discover the local device 104b and may determine it to be a suitable target of the requested data transmission during the data transmission session 110b. The wireless device 102 may also utilize the Bluetooth upper stack 302 and the Bluetooth MAC/PHY 304 to establish the Bluetooth connection 106b with the local device 104b, which may enable performing connection setup operations that may comprise pairing and/or security key initialization. The wireless device 102 may utilize the Bluetooth upper stack 302 and the secondary MAC/PHY layer 306a to establish the high speed data connection 108b to the local device 104b. Once the high speed data connection 108b is established, the wireless device 102 may transmit high speed data to the local device 104b over the high speed data connection 108b.

In another embodiment of the invention, the Bluetooth connections 106a and/or 106b may be utilized during the data transmission via the high speed data connections 108a and/or 108b to continually monitor and/or manage the data transmissions. The wireless device 102 and the local devices 104a and/or 104b may exchange necessary control messages over the Bluetooth connections 106a and/or 106b during the transmission of data over the high speed data connections 108a and/or 108b.

Various embodiments of the invention may enable different combinations utilizing applications that may be run in the wireless device 102, in the application layer 202, and PHY layers that may be utilized in the wireless device 102 for high speed data communication. For example, an application running in the wireless device 102 may determine based on information, such as available bandwidth, via the application layer 202, the Bluetooth core 204, and/or one or more of PAL/HCI layers, that high speed data communication may need to be multiplexed and/or partitioned over plurality of available secondary MAC/PHY layers. Also, two or more applications running in the wireless device 102 may be enabled, via the application layer 202, the Bluetooth core 204, and/or one or more of PAL/HCI layers, may be enabled to share a single secondary MAC/PHY for high speed data communication, Finally, a plurality of applications running in the wireless device 102 may be enabled to utilize, simultaneously, plurality of available secondary MAC/PHY layers in the wireless device 102, wherein some of said applications may utilize solely one or more secondary MAC/PHY layers, and/or some of said applications may share one or more of said plurality of available secondary MAC/PHY layers. Furthermore, sharing of one or more available secondary MAC/PHY layers in the wireless device 102, by one or more applications running in the wireless device 102, may be performed dynamically, wherein any multiplexing and/or partitioning of data sent from/to said one or more application may be updated and/or modified based on information affecting availability of data communications via said one or more PHY layers.

Figure 4:
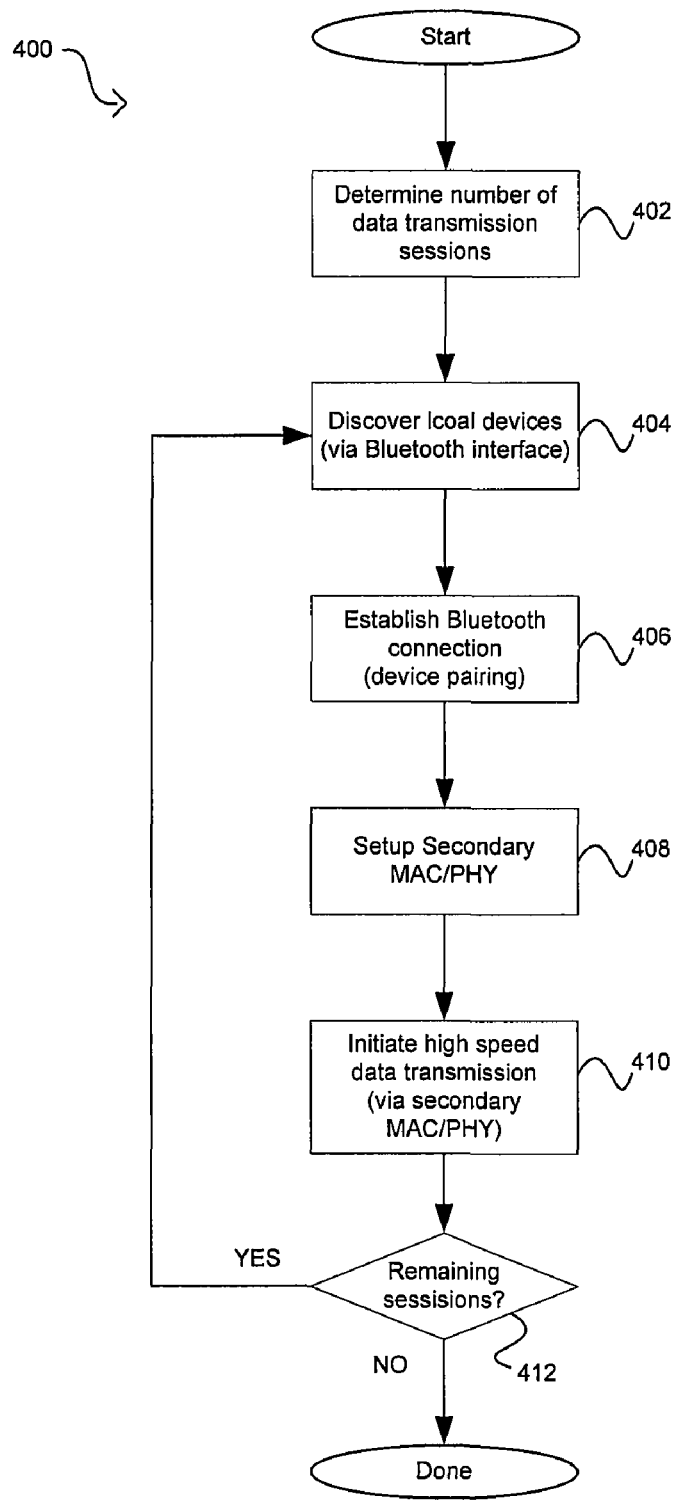
FIG. 4 is a flow diagram illustrating use of multisession Bluetooth communication using multiple MAC/PHY layers, in accordance with an embodiment of the invention.

FIG. 4 is a flow diagram illustrating use of multisession Bluetooth communication using multiple MAC/PHY layers, in accordance with an embodiment of the invention. Referring to FIG. 4, there is shown a flow chart 400 comprising a plurality of exemplary steps. In step 402, the number of multisessions that may be utilized contemporaneously in a wireless device may be determined. Use of multiple data communication sessions may be required and/or desired to enable utilization of plurality of local devices and/or to enable optimal division of tasks within a requested job. For example, the wireless device 102 may determine that multisessions may be desirable to enable transmission of high speed video data to the local device 104a and transmission of high speed audio data to the local device 104b.

In step 404 a wireless device may utilize the Bluetooth protocol to perform discovery operations wherein other wireless devices within operational proximity of Bluetooth interface may be detected and/or contacted. For example, the wireless device 102 may utilize legacy Bluetooth stack comprising the Bluetooth core 204, the Bluetooth HCI 210, the Bluetooth HCI Link management layer 212, and the Bluetooth radio to perform such discovery operations in order to discover local device 104a and/or 104b. In step 406, a Bluetooth connection may be established between a wireless device and a local device. For example, the wireless device 102, having discovered the local device 104a in step 402, may establish the Bluetooth connection 106a utilizing the Bluetooth legacy stack 200 and/or Bluetooth PHY layers in both devices, substantially as described in FIG. 3. Similarly, the wireless device 102, having discovered the local device 104b in step 402, may establish the Bluetooth connection 106b utilizing the Bluetooth legacy stack 200 and/or Bluetooth PHY layers in both devices, substantially as described in FIG. 3.

Once the Bluetooth connection is established, Bluetooth-based operations maybe performed via the established Bluetooth connection. For example, the Bluetooth connection 106a may be utilized to setup and/or exchange security keys that may be utilized to encrypt and/or decrypt data transmitted between the wireless device 102 and local device 104a. Similarly, the Bluetooth connection 106b may be utilized to setup and/or exchange security keys that may be utilized to encrypt and/or decrypt data transmitted between the wireless device 102 and local device 104b. Additionally, the Bluetooth connection may be utilized to perform operations and/or functions that may be necessary for establishing high speed data connections. For example, while Bluetooth communication may be performed utilizing omni-directional antenna, high speed data transmission may be performed via directional antenna that may enable efficient and/or optimal communication because less power may be utilized to guaranteed reception of data at target end. Accordingly, the Bluetooth connections 106a and/or 106b may be utilized to perform said directional antenna alignment between the wireless device 102 and the local devices 104a and/or 104b, respectively.

In step 408, the secondary MAC/PHY layer may be setup. A wireless device may utilize a media access and physical layer related to an available wireless protocol that may comprise WLAN (802.11), Ultra-wideband (UWB), and/or 60 GHz, each of which may enable higher data rates that available via the Bluetooth interface. For example, the wireless device 102 may utilize the Bluetooth stack 200 to establish 60 GHz connection with the local device 104a via the 60 GHz PAL/HCI layer 228, the 60 GHz MAC layer 230, and the 60 GHz PHY layer 232. Similarly, the wireless device 102 may utilize the Bluetooth stack 200 to establish UWB connection with the local device 104b via the UWB PAL/HCI 222, the UWB MAC layer 224, and the UWB PHY layer 226. In step 410, high speed transmission may initial via the established secondary media access and physical layer established in step 408.

In another embodiment of the invention, the Bluetooth connection established in step 406 may be utilized throughout the high speed data transmission to continually monitor and/or manage the data transmission. In step 412, a determination whether all data communication sessions have been created is performed. In instances where the required and/or desired sessions are established, the process may terminate at the done step. Returning to step 412, in instances that one or more un-setup sessions may remain, the process may return to step 404, where new session may be established. While the flow chart may indicate that establishing the required and/or desired data transmission session may be performed sequentially, the establishment of the multiple sessions may also be performed contemporaneously.

Various embodiments of the invention may comprise a method and system for multisession Bluetooth communication using multiple physical (PHY) layers. The wireless device 102 may utilize plurality of Bluetooth-based data communication sessions 110a and/or 110b to perform a plurality of applications simultaneously in the wireless device 102. The Bluetooth interface may be utilized to perform initial connectivity and/or control functionality associated with each of said plurality of Bluetooth-based data communication sessions 110a and/or 110b. This connectivity and/or control functionality may comprise discovery, pairing, and/or initial connection with one or more of plurality of local device 104a and/or 104b. Each of said plurality of Bluetooth-based data communication sessions 110a and/or 110b may comprise utilizing one or more of a plurality of high speed data standards to perform data transmission and/or reception. The plurality of high speed data standard may comprise WLAN, ultra-wideband (UWB), and/or 60 GHz PHY, and/or PHY/MAC layers. Two or more of the plurality of Bluetooth Bluetooth-based data communication sessions 110a and/or 110b may contemporaneously utilize different PHY and/or PHY/MAC layers pertaining to the same high speed data standard. Performing each of the plurality of application may comprise utilizing one or more of said plurality of Bluetooth-based data communication sessions 110a and/or 110b sessions. Bluetooth physical layer may enable dynamic or continued management of data transmission during said Bluetooth-based data communication sessions. Data transmitted by an application running within the wireless device 102 may be multiplexed onto one or more of said Bluetooth-based data communication sessions.

Another embodiment of the invention may provide a machine-readable storage, having stored thereon, a computer program having at least one code section executable by a machine, thereby causing the machine to perform the steps as described herein for multisession Bluetooth communication using multiple physical (PHY) layers.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for wireless communication, the method comprising:
in a wireless device that comprises a single Bluetooth stack that is utilized to manage a Bluetooth radio interface that is accessed via a Bluetooth physical layer and to manage a plurality of non-Bluetooth radio interfaces that are accessed via a corresponding plurality of non-Bluetooth medium access control (MAC)/physical layer (PHY) layers:
when said Bluetooth radio interface cannot perform a required data communication, setting up, utilizing said Bluetooth physical layer, a plurality of data communication sessions; and
communicating data for said plurality of data communication sessions between said wireless device and one or more other wireless devices using said single Bluetooth stack and via one or more of said plurality of non-Bluetooth MAC/PHY layers.

2. The method according to claim 1, comprising performing pairing, discovery, and/or security key establishment via said Bluetooth physical layer during said setup of each of said plurality of data communication sessions.

3. The method according to claim 1, wherein each of said plurality of non-Bluetooth radio interfaces operates at higher data communication rates than said Bluetooth radio interface.

4. The method according to claim 3, wherein said plurality of non-Bluetooth radio interfaces comprises WLAN, Ultra-wideband (UWB), and 60 GHz interfaces.

5. The method according to claim 1, wherein each of said plurality of data communication sessions utilizes one or more media access control (MAC) addresses.

6. The method according to claim 1, comprising utilizing one or more directional antennas to perform said communication of data during said plurality of data communication sessions.

7. The method according to claim 1, wherein said Bluetooth physical layer operates in non-burst mode.

8. The method according to claim 1, wherein each of said plurality of non-Bluetooth radio interfaces operates in non-burst mode.

9. The method according to claim 1, wherein said communicated data comprises multimedia data.

10. The method according to claim 1, wherein said communication of data during each of said plurality of data communication sessions occurs transparently with respect to said wireless device.

11. The method according to claim 1, comprising dynamically managing said plurality of data communication sessions via said Bluetooth physical layer.

12. The method according to claim 1, comprising multiplexing at least a portion of data communicated during each of said plurality of data communication sessions onto at least a portion of said plurality of non-Bluetooth MAC/PHY layers.

13. The method according to claim 1, comprising multiplexing at least a portion of data communicated from an application running in said wireless device onto one or more of said plurality of data communication sessions.

14. The method according to claim 1, comprising multiplexing at least a portion of data communicated from plurality of applications running in said wireless device onto one or more of said plurality of data communication sessions.

15. The method according to claim 1, comprising multiplexing at least a portion of data communicated to and/or from each said one or more other wireless devices onto plurality of said plurality of data communication sessions.

16. The method according to claim 1, comprising determining when said Bluetooth radio interface cannot perform a required data communication based on a type of connection, a data rate, and/or a required latency.

17. A system for wireless communication, the system comprising:
one or more processors for use within a wireless device that comprises a single Bluetooth stack, said single Bluetooth stack being utilized to manage a Bluetooth radio interface that is accessed via a Bluetooth physical layer and to manage a plurality of non-Bluetooth radio interfaces that are accessed via a corresponding plurality of non-Bluetooth medium access control (MAC)/physical layer (PHY) layers, said one or more processors being operable to:
when said Bluetooth radio interface cannot perform a required data communication, set up, utilizing said Bluetooth physical layer, a plurality of data communication sessions; and
communicate data for said plurality of data communication sessions between said wireless device and one or more other wireless devices using said single Bluetooth stack and via one or more of said plurality of non-Bluetooth MAC/PHY layers.

18. The system according to claim 17, wherein said one or more processors enable performing pairing, discovery, and/or security key establishment via said Bluetooth physical layer during said setup of each of said plurality of data communication sessions.

19. The system according to claim 17, wherein each of said plurality of non-Bluetooth radio interfaces operates at higher data communication rates than said Bluetooth radio interface.

20. The system according to claim 19, wherein said plurality of non-Bluetooth radio interfaces comprises WLAN, Ultra-wideband (UWB), and 60 GHz interfaces.

21. The system according to claim 17, wherein each of said plurality of data communication sessions utilizes one or more media access control (MAC) addresses.

22. The system according to claim 17, wherein said one or more processors enable utilizing one or more directional antennas to perform said communication of data during said plurality of data communication sessions.

23. The system according to claim 17, wherein said Bluetooth physical layer operates in non-burst mode.

24. The system according to claim 17, wherein each of said plurality of non-Bluetooth radio interfaces operates in non-burst mode.

25. The system according to claim 17, wherein said communicated data comprises multimedia data.

26. The system according to claim 17, wherein said communication of data during each of said plurality of data communication sessions occurs transparently with respect to said wireless device.

27. The system according to claim 17, wherein said one or more processors enable dynamic management of said plurality of data communication sessions via said Bluetooth physical layer.

28. The system according to claim 17, wherein said one or more processors enable multiplexing at least a portion of data communicated during each of said data communication sessions onto at least a portion of said plurality of non-Bluetooth MAC/PHY layers.

29. The system according to claim 17, wherein said one or more processors enable multiplexing at least a portion of data communicated from an application running in said wireless device onto one or more of said plurality of data communication sessions.

30. The system according to claim 17, wherein said one or more processors enable multiplexing at least a portion of data communicated from a plurality of applications running in said wireless device onto one or more of said plurality of data communication sessions.

31. The system according to claim 17, wherein said one or more processors enable multiplexing at least a portion of data communicated to and/or from said one or more other wireless devices onto one or more of said plurality of data communication sessions.

32. The system according to claim 17, wherein said one or more processors are operable to determine when said Bluetooth radio interface cannot perform a required data communication based on a type of connection, a data rate, and/or a required latency.

* * * * *